United States Patent Office 3,077,739
Patented Feb. 19, 1963

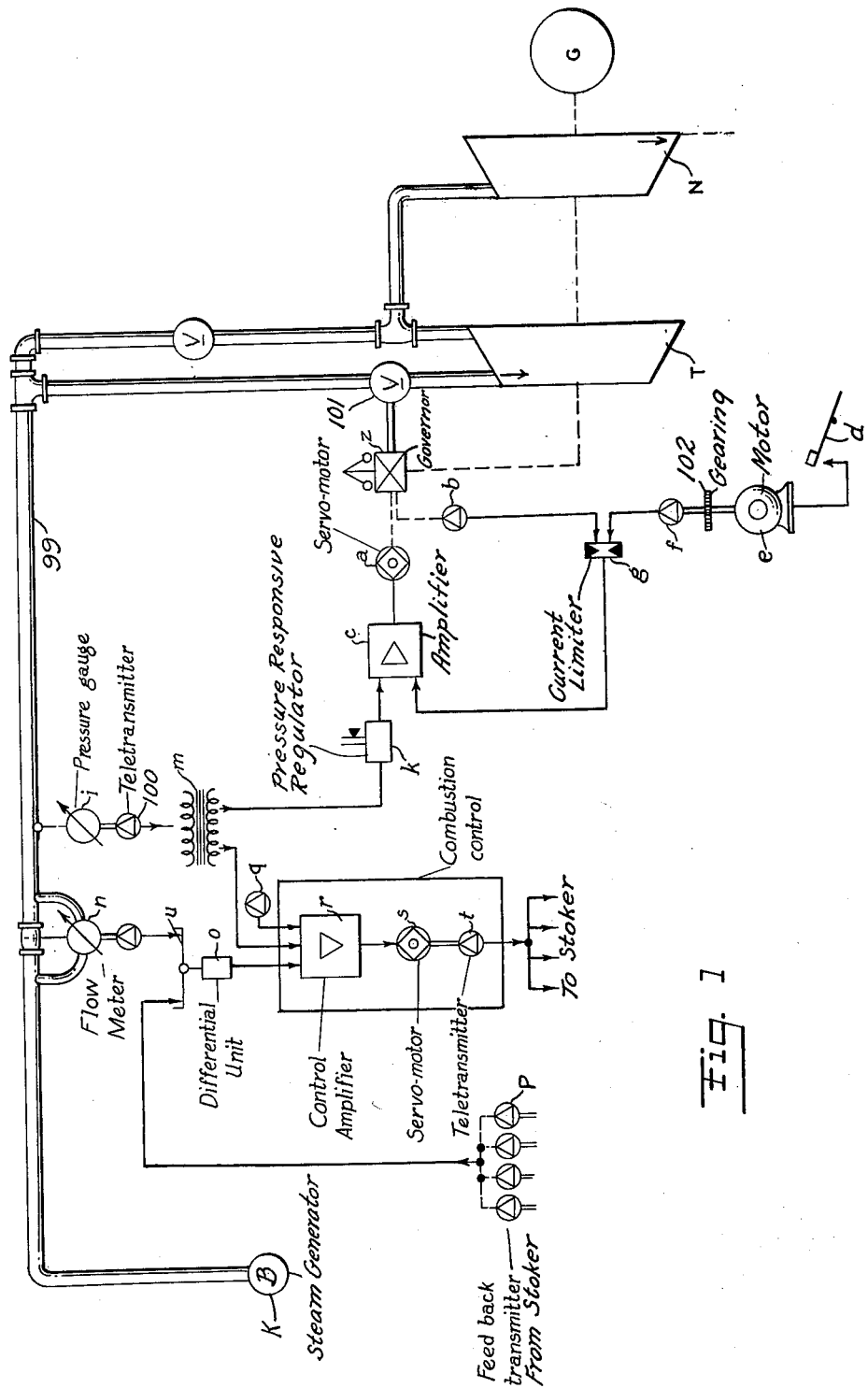

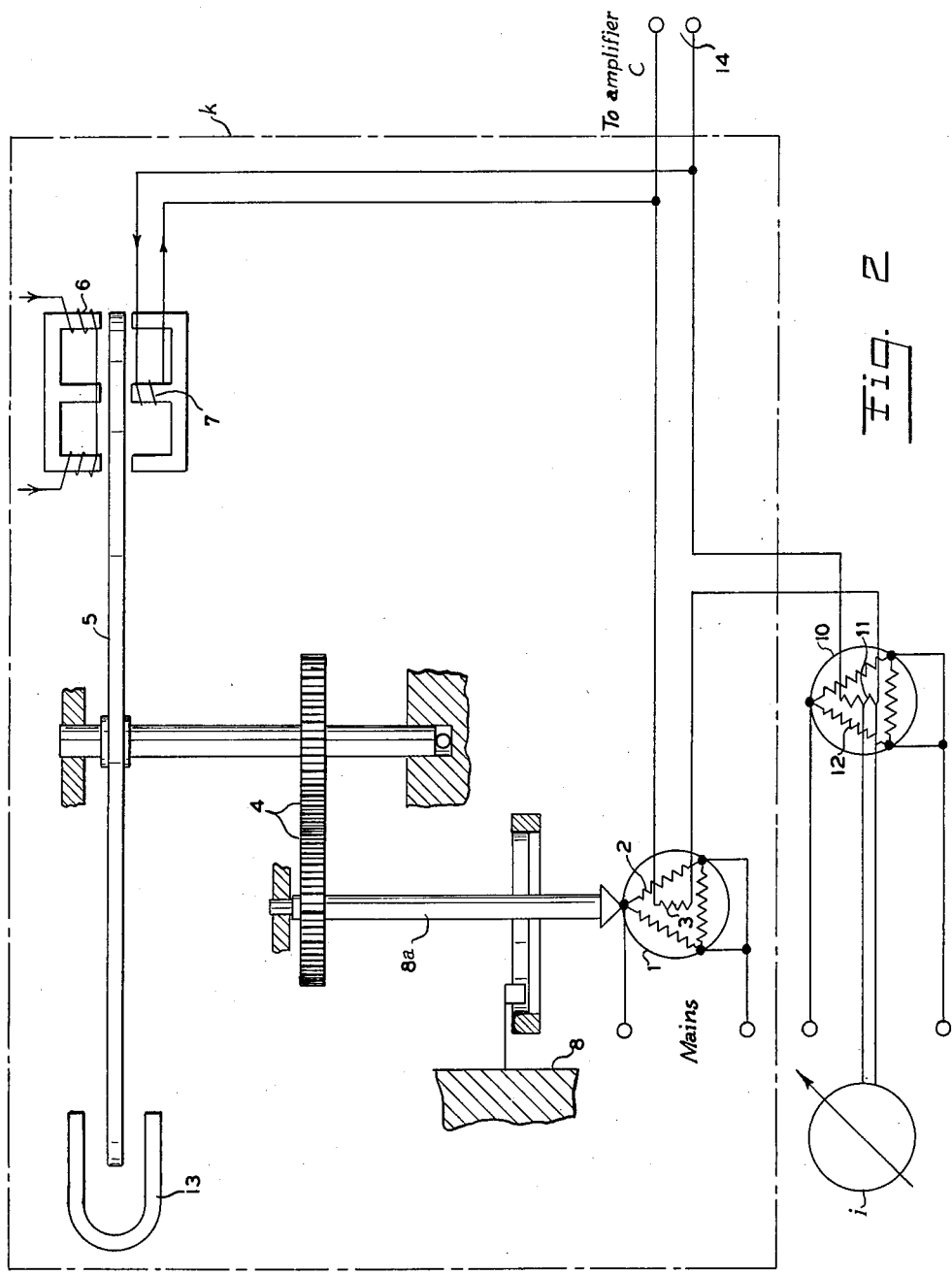

3,077,739
BOILER CONTROL SYSTEM
Adolf Krüssmann, Minden, Westphalia, Germany, assignor, by mesne assignments, to Sulzer Freres Societe Anonyme, Winterthur, Switzerland, a corporation of Switzerland
Filed Aug. 31, 1959, Ser. No. 836,953
Claims priority, application Germany Sept. 3, 1958
8 Claims. (Cl. 60—105)

Steam generators for turbines driving electrical generators are usually supplied with fuel supply and combustion controls, so as to tend to provide a constant steam pressure for the turbines, the controls being responsive to the pressure. The speed of the turbines is controlled by varying, with a governor, the amount of steam drawn from the steam generator and supplied to the turbine. When the electrical generators produce alternating current, particularly for public distribution, it is desirable that the speed of the turbines, and with it the current frequency, be kept at a constant value.

On the other hand, the governor may, under heavy load, pass so much steam that the pressure in the steam line and boiler drops dangerously low. For this reason in large installations it is common to control the speed of the turbine as a function of steam pressure at the inlet of the turbine and so avoid overloads on the furnace.

However a generating station with speed control as a function of turbine inlet pressure will likely disturb the current frequency in the distribution system and overload other stations in the system.

An object of this invention is to provide means and methods for maintaining substantially constant speed and frequency, but which will also prevent dangerous overloads on the boiler and furnace under especially adverse conditions.

The invention is based on a method for controlling a plant consisting of a steam generator and a turbine where the steam turbine is equipped with a speed controller and the steam generator being fitted with a steam pressure controller. In case of a pressure drop at the turbine inlet below the preset value the speed controller is influenced as a function of the steam pressure, that means with decreasing speed at decreasing steam pressure. Influencing the speed control as a function of the steam pressure at the turbine inlet is achieved by varying the desired speed if the inlet pressure drops below the minimum value, i.e. decreasing speed with decreasing steam pressure.

FIG. 1 is a schematic representation of the invention, and

FIG. 2 shows details of a control shown in FIG. 1.

In the drawing (FIG. 1) the invention is shown in connection with a turbine supplied with steam from a steam generator. K denotes the steam generator, 99 the usual steam line, T the high pressure turbine and N the coupled low pressure turbine which are used as common drive of A.C. generator G. The combustion control of the steam generator is only represented schematically. The shown example uses a pressure controller with proportional-integral action, the steam consumption serving as setpoint. Pressure gauge $i$ is coupled to a teletransmitter 100 the output voltage of which is fed via transformer $m$ to control amplifier $r$ of the combustion controller. In the drawing electrical channels are shown as single solid lines as will be understood by those skilled in the art. The set value adjuster of this combustion controller is denoted $q$. Control amplifier $r$ feeds servomotor $s$, the latter adjusting the coal supply to the combustion. The adjustment of fuel distribution is represented electrically by feedback transmitter $p$ and fed back to the input of control amplifier $r$ via the differential unit $o$. The steam flow to the turbine is measured in the steam line by flow meter $n$, the coupled teletransmitter producing an electric signal which is also connected to control amplifier $r$ via differential unit $o$.

The speed control of turbines T and N is carried out by speed controller or governor having a variable set point and $z$ connected to the turbine shaft (the connection to the turbine shaft is not shown in details), the speed controller acting on steam throttle 101 at the turbine inlet. For the setpoint adjustment of speed control unit $z$ the servomotor, coupled to the usual adjustment means, $a$ is provided and which servomotor is fed by servo-amplifier $c$. The setpoint adjustment of speed controller $z$ is represented by teletransmitter $b$ as electric signal connected to the input of servo-amplifier $c$. Remote control of the desired speed is achieved by actuating switch key $d$. Motor $e$ coupled to teletransmitter $f$ starts running when the key is pressed. The output voltage of teletransmitter $f$ is also connected to the input of servo-amplifier $c$ for motor $a$. For the turbine control, especially for adjusting the desired speed by means of teleadjustment it is recommended not to force excessive changes of speed because sudden speed or load changes may have an unfavourable effect. Therefore between motor $e$ and position teletransmitter $f$ a gearing 102 with high transmission may be inserted which can only produce small changes for the remote adjustment of the desired speed. Transformer $m$ connected to the position teletransmitter of steam pressure gauge $i$ is fitted with an additional secondary winding feeding the followup or compensation unit $k$ shown in detail in FIG. 2. The unit $k$ receives signal current from the transformer (although for clarity in FIG. 2 the unit is shown connected directly to the gauge $i$ and its teletransmitter designated as 10) and supplies signals to the amplifier $c$ for the altering of the set point of the governor $z$ in accordance with steam pressure somewhere between the boiler and turbine preferably as shown on the boiler side of the governor, but these signals only become highly effective if the steam pressure drops below the set value.

FIG. 2 shows compensation unit $k$ transforming the output signal of the pressure gauge in such a manner that it becomes only effective after dropping below the set value of the desired pressure deviation. The principle of operation is described below with reference to this figure.

The compensation or follow-up element respectively consists of inductive teletransmitter 1 with fixed winding 2 connected to the mains and rotatable winding 3 connected via transmission gear 4 to rotor 5 of an induction motor. The exciting winding of this induction motor is shown by numeral 6 and the control winding by numeral 7. The deflection of rotatable winding 3 of teletransmitter 1 is limited by adjustable stop 8 of the shaft $8a$ of teletransmitter 1. The input signal to be compensated to a definite value originates from teletransmitter 10. Its rotor is coupled to the steam pressure gauge corresponding to instrument $i$ in FIG. 1. Rotor 11 of teletransmitter 10 is connected opposite in series to the rotor winding of teletransmitter 1 and in series with exciting winding 7 of motor 5. Rotation of rotor winding 11 of teletransmitter 10 connected to pressure gauge $i$ results in a readjustment of rotor winding 3 of teletransmitter 1 by motor 5. As long as in teletransmitters 1 and 10 the two windings 3 and 11 have the same position with respect to their exciting windings 2 and 12, the induced voltages cancel each other. Consequently the voltage tapped off at 14 has a zero value. This condition is generally maintained by motor 5.

However this is valid only until the shaft of teletransmitter 1 reaches stop 8 and from this moment the follow-up motor 5 can no longer readjust winding 3 of teletransmitter 1 with respect to winding 11 of teletransmitter 10. Consequently a differential voltage is produced at 14. The voltage tapped off at 14 has the desired property that it becomes effective only in cases, when the deflection of the rotor 11 in the synchron 10 exceeds a certain preadjusted value. The differential voltage produced at 14 is fed to the input of servo-amplifier c (FIG. 1) for obtaining the desired characteristic of the speed control. The construction of this unit corresponds to a derivative element which is generally used for inductive control and, for instance, at o. Therefore an existing unit can be used which is only to be supplemented by adjustable stops such as 8. This method has also the special advantage that the derivative action exists as long as the stops have not become effective. In other words, as alluded to above in pointing out that voltage at the lines 14 might overbalance the signals from the transmitter b, while an object of the invention is to protect the system against dangerously low pressure, there is also protection against rapid falls of pressure. Therefore sudden load surges reducing unduly the boiler pressure also causes a setpoint adjustment of the turbine speed controller, thus avoiding too much drawing off of steam. For adjusting the measure of the derivative effect the induction motor 5 is fitted with an adjustable damping device represented by damping magnet 13. Therefore when adjusting the damping device the steam quantity can be adjusted in a simple way to the requirements of operation.

The control signal to the input of servo-amplifier c and supplied by pressure gauge i in conjunction with follow-up system k, when dropping below a strength corresponding to an adjusted pressure, has preference over the signal of the teletransmitter for speed remote adjustment f and also over the feedback signal of the output signal of teletransmitter b. Therefore both teletransmitters f and b are not connected direct to the input of servo-amplifier c but via limiting device g which does not restrain the control under normal conditions, i.e. if the steam pressure at the turbine inlet remains within the prescribed range, and no signal depending on pressure is produced for the remote adjustments to the desired speed. The limiting device g is such that an output signal from follow-up system k ensures an outbalance of the latter over the adjusting or feedback signal respectively. As limiting device it is possible to use, for instance, a combination of counter-connected rectifiers with blocking layer through which A.C. can only flow above a certain limit value.

As protection against exceeding the permissible steam pressure in the steam generator, overflow valve V is arranged in a known manner for bridging the high pressure part of the turbine. This overflow valve responds already at an overpressure where the already existing safety valve of the steam generator does not yet respond and therefore appreciable losses can be avoided.

Operation of the invention can be understood and briefly summed up by observing that the furnace fires are regulated in response to steam drawn as sensed by the flow meter n on the steam line near the boiler K (left corner FIG. 1) and in response to the steam pressure as sensed by the gauge i, and with feed back transmitter P. This much is more or less conventional.

For the control of turbine speed by the governor z, the latter's set point feed back transmitter b sends limited power signals to the servo amplifier c to tend to keep the set-point positioned for constant desired speed and frequency.

However, when the governor opens its throttle valve 101 the steam pressure tends to diminish, causing the pressure gauge to fall. Falling of the gauge pressure produces two effects, the first of which is to boost combustion through the channel via the transformer m, the control amplifier and the servo-motor S. The second effect is to tend to vary the set point of the governor z to tend to close the throttle 101, via the channel from the transformer m, the limiting control (with follower) k, and the servo-amplifier c and the motor a for changing the set-point of the governor.

The details of the control k are shown (with the transformer m between it and the gauge i omitted for simplicity) in FIG. 2. The control k performs two functions. It translates a rate of fall of the gauge i into a voltage impressed on the servo-amplifier c for altering the set point on the governor z to a lower speed. Secondly, it translates a dangerously low pressure at gauge i into a voltage similarly applied to the amplifier c, which voltage over-balances signals from the teletransmitter b.

The mentioned translations are accomplished by a selsyn device shown as two rotor-stator systems 1 and 10, the rotors 3 and 11 being electrically connected in opposition, and the stators 2 and 12 excited. With the rotors of the two systems in the same position relative to their stators 2 and 21, no current flows in the circuit of the motors; but with the rotors out of corresponding position, current is induced in their circuit. This circuit is employed to drive a motor 5, 6, 7 to move the rotor 3, usually until no current to drive the motor 5 is produced, following a movement of the rotor 11 and its ganged gauge.

The stop 8 limits the movement of shaft 8a and rotor 3 at a predetermined danger position so that when this position is reached the motor 5, 6, 7 cannot reduce the rotor circuit voltage to zero. The output (at 14) then acts on the servo-amplifier to lower the set point of the governor, and reduce speed, and protect the system.

When the load is lightened and the pressure rises, the output of the control k approaches zero, with the governor's teletransmitter tending to restore the set-point on the governor to the correct positions, with the shaft 8a tending to return to normal position.

As additional protection of the steam generator against overpressure the follow-up system k can be fitted with a stop as limitation of an increasing deflection. When exceeding the desired pressure the teletransmitter supplies a voltage to pressure gauge e which from a certain value can no longer be compensated by follow-up system k and which therefore acts on the input of servo-amplifier c. Consequently via servomotor a the control valve of the turbine is opened temporarily, the turbine is supplied with an increased steam quantity acting itself as overflow regulator. The excess output supplied by the turbine is then taken over by the energy distributing system. This procedure also contributes to a reduction of the boiler pressure to the normal value without loss and to its stabilisation. If the current generating system is operated separately and is disconnected from the mains as is the case with emergencies, it is possible to supplement the speed control system by an additional control signal transmitter consisting of a frequency meter and an integrating transmitter for the frequency. In this way the proportional action of the turbine control is transformed into integral action. However generally it will not be possible to carry out this integral correction because separate emergency operation means and short frequency variations within the static range have to be taken into consideration also because it is possible to carry out manual frequency correction by the adjusting device for the desired speed as shown in FIG. 1. Naturally in case of a mains failure and separate operation of the current generating station the describd use of a turbine for overflow control by limiting the inductive transmitter in follow-up unit k may not be achieved since an excess output cannot be consumed by the mains and the turbine speed would rise too high. Therefore in case of separate operation equipment has to be used which connects an additional voltage to the follow-up unit shown in FIG. 2 so that inductive transmitter 1 (FIG. 2) cannot reach the upper stop.

A further possibility is to connect the output voltage of the teletransmitter of pressure gauge $e$ alternatively direct to servo-amplifier $c$ by by-passing the time unit. In this case the desired speed is controlled as a function of the steam pressure at the turbine inlet and the speed control to a constant value becomes ineffective. Elimination of the follow-up unit $k$ is possible simultaneously with switching over the control to manual operation so that in case of emergency the turbine controller acts as a controller depending on the inlet pressure and not as a speed regulator.

I claim:

1. A method for controlling the flow of steam from a steam generator to a turbine having a throttle governor responsive to turbine speed and having an adjustable set point, said method comprising sensing the pressure of the steam from the generator and ahead of the throttle of the governor and varying the set point toward decreasing speed when the pressure falls below a predetermined value.

2. An apparatus for controlling the steam flow from a steam generator to a turbine comprising a governor connected to the turbine and responsive to the speed thereof, the governor having a variable set point and including a throttle valve for the control of flow of steam from the generator to the turbine, electrical means for varying the set point, sensing means for measuring steam pressure substantially in the generator, an electric transmitter coupled with the sensing means for transmitting signals as a function of the pressure to said electrical means, and a compensating device for compensating the output of the transmitter when the signals do not drop below a predetermined value.

3. An apparatus for controlling the steam flow from a boiler to a turbine comprising a governor responsive to speed of the turbine and having a throttle valve connected to the turbine, the governor having a variable set point responsive to varying electrical values, sensing means for measuring the steam pressure substantially at the boiler, an electrical transmitter coupled with the sensing means for converting pressure values to electrical values and transmitting same to the governor to vary the set point thereof, and limiting means to prevent the output of the transmitter from affecting the governor except when the steam pressure falls below a predetermined amount or at a rate greater than a predetermined value.

4. An apparatus for controlling the flow of steam from a boiler to a turbine comprising an electrically controlled governor responsive to speed and having a throttle valve for the turbine, the governor having a variable set point responsive to change in voltage applied to the governor, electrical sensing means for measuring the steam pressure at a point between boiler and the turbine, and means connected to the governor and to the sensing means for lowering the set point of the governor when the pressure falls below a predetermined value to slow the turbine and prevent a dangerously low pressure in the boiler.

5. An apparatus as claimed in claim 4, said means for lowering the set point including means for lowering the set point when the pressure falls faster than at a predetermined rate.

6. An apparatus for varying the flow of steam through a steam line from a boiler to a turbine and comprising a speed-responsive throttle valve governor having an electrically variable set point for the turbine, a pressure gauge for the steam line, a selsyn transmitter ganged with the gauge so that the rotor of the transmitter turns with variations in pressure, a selsyn receiver having a rotor, means for stopping the receiver rotor at a predetermined position, motor means for turning the rotor of the receiver to tend to keep the rotors with the same angular displacement from a predetermined zero position, said rotors being serially connected in opposition so that excitation of the transmitter and receiver produces no current in the rotor's circuit when the rotors are displaced the same amount from the zero point, but does flow when the rotors are displaced relative to each other, said motor being connected into the rotor's circuit so as to tend to drive the receiver rotor when the rotors are out of corresponding positions, an electrical means for varying the set point of the governor and connected into the circuit of the rotors, whereby when the motor turns the receiver rotor as far as the point of stoppage, further movement of the rotor of the transmitter by increasing steam pressure causes a generation of current in the circuit of the rotors to energize the means for varying of the set point of the governor.

7. An apparatus as claimed in claim 6, and a teletransmitter on the governor having the output thereof connected to the means for varying the set point, the output of the circuit of the rotors being in opposition to that of the teletransmitter and at dangerously low steam pressure sufficient to overbalance it.

8. In combination with the apparatus claimed in claim 3, a boiler and turbine with connecting steam lines, and an alternating current generator driven by the turbine, said apparatus affording a means to keep the current frequency substantially constant until the steam pressure falls to a predetermined pressure.

References Cited in the file of this patent

UNITED STATES PATENTS

| 1,063,547 | Kieser | June 3, 1913 |
| 1,873,955 | Creager | Aug. 30, 1932 |
| 1,899,556 | Caughey | Feb. 28, 1933 |
| 2,823,686 | Anderson et al. | Feb. 18, 1958 |
| 2,896,652 | Goetsch et al. | July 28, 1959 |

FOREIGN PATENTS

| 623,285 | Germany | Dec. 17, 1935 |